United States Patent
Hagen et al.

(10) Patent No.: US 11,456,760 B1
(45) Date of Patent: Sep. 27, 2022

(54) LINEARIZING NARROWBAND CARRIERS WITH LOW RESOLUTION PREDISTORTERS

(71) Applicant: MOTOROLA SOLUTIONS, INC., Chicago, IL (US)

(72) Inventors: Rodney W. Hagen, Lake in the Hills, IL (US); Gregory J. Buchwald, Crystal Lake, IL (US); Dennis M. Drees, Deer Park, IL (US); In S. Kim, Buffalo Grove, IL (US); Arthur Christopher Leyh, Spring Grove, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/193,939

(22) Filed: Mar. 5, 2021

(51) Int. Cl.
  *H04B 1/04* (2006.01)
  *H04B 17/318* (2015.01)
  *H04B 1/10* (2006.01)

(52) U.S. Cl.
  CPC ............ *H04B 1/04* (2013.01); *H04B 1/1036* (2013.01); *H04B 17/318* (2015.01); *H04B 2001/0425* (2013.01); *H04B 2001/0433* (2013.01); *H04B 2001/0491* (2013.01)

(58) Field of Classification Search
  CPC .......... H04B 17/318; H04B 2001/0425; H04B 2001/0433; H04B 2001/0491; H04B 1/04; H04B 1/1036
  USPC ........................................................ 375/297
  See application file for complete search history.

(56) References Cited

U.S. PATENT DOCUMENTS

| | | | | |
|---|---|---|---|---|
| 5,051,704 A | * | 9/1991 | Chapman | H03F 1/3235 330/149 |
| 5,912,586 A | * | 6/1999 | Mitzlaff | H03F 1/3229 330/149 |
| 5,959,499 A | * | 9/1999 | Khan | H03D 7/168 330/149 |
| 6,240,278 B1 | * | 5/2001 | Midya | H04B 1/04 330/149 |
| 6,614,854 B1 | * | 9/2003 | Chow | H04L 27/368 332/162 |
| 6,646,505 B2 | * | 11/2003 | Anderson | H03F 1/3276 330/144 |
| 6,677,870 B2 | * | 1/2004 | Im | H04B 1/0475 341/110 |

(Continued)

*Primary Examiner* — James M Perez
(74) *Attorney, Agent, or Firm* — Michael Best & Friedrich LLP (57) ABSTRACT

Apparatus and method for linearizing narrowband carriers with low resolution predistorters are provided. The method includes amplifying, using a power amplifier, one or more broadcast carriers and linearizing, using a predistorter coupled to the power amplifier, the one or more broadcast carriers. The method also includes determining, using an electronic processor, a composite bandwidth of the one or more broadcast carriers and determining, using the electronic processor, whether the composite bandwidth is below a modulation bandwidth of the predistorter. The method further includes controlling, using the electronic processor, a pacification carrier generator coupled to the electronic processor to combine a pacification carrier with the one or more broadcast carriers when the composite bandwidth is below the minimum modulation bandwidth of the predistorter.

24 Claims, 7 Drawing Sheets

(56) References Cited

U.S. PATENT DOCUMENTS

| | | | | |
|---|---|---|---|---|
| 6,782,038 B1* | 8/2004 | Khlat | H03D 7/165 | 375/147 |
| 6,801,082 B2* | 10/2004 | Midya | H03F 1/0277 | 330/136 |
| 6,838,931 B2* | 1/2005 | Midya | H03G 3/004 | 330/10 |
| 7,170,344 B2* | 1/2007 | Suzuki | H03F 1/3252 | 330/149 |
| 7,289,575 B1* | 10/2007 | Kenington | H03F 1/3258 | 330/144 |
| 8,340,214 B2* | 12/2012 | Kang | H04L 25/03343 | 375/232 |
| 8,340,602 B1* | 12/2012 | Peiris | H03F 1/3241 | 455/114.3 |
| 8,606,197 B2* | 12/2013 | Bai | H03F 1/3294 | 455/105 |
| 8,611,459 B2* | 12/2013 | McCallister | H03F 3/245 | 375/295 |
| 8,675,714 B2* | 3/2014 | Cheung | H04L 25/03878 | 379/348 |
| 8,760,222 B2* | 6/2014 | Schwent | H03F 1/0222 | 327/555 |
| 8,775,992 B2* | 7/2014 | Lee | G02F 1/025 | 716/111 |
| 8,824,529 B2* | 9/2014 | Fukuda | H04B 1/40 | 455/39 |
| 8,824,975 B2* | 9/2014 | Sato | H03F 3/24 | 455/78 |
| 8,831,136 B2* | 9/2014 | Ishikawa | H03F 1/3241 | 375/295 |
| 8,861,637 B2* | 10/2014 | Na | H04L 25/03343 | 375/232 |
| 8,895,913 B2* | 11/2014 | Tekin | H03B 19/00 | 250/252.1 |
| 9,191,020 B2* | 11/2015 | Tekin | H04L 7/0331 | |
| 9,191,127 B2* | 11/2015 | Koli | H03H 19/008 | |
| 9,246,719 B2* | 1/2016 | Pullela | H03D 7/165 | |
| 9,268,890 B2* | 2/2016 | Lee | G06F 30/20 | |
| 9,442,066 B2* | 9/2016 | Tekin | G01N 21/3581 | |
| 9,602,184 B2* | 3/2017 | Honda | H01Q 3/26 | |
| 9,634,695 B1* | 4/2017 | Subrahmaniyan Radhakrishnan | H03F 3/24 | |
| 10,027,358 B2* | 7/2018 | Wu | H03D 7/165 | |
| 10,116,370 B2* | 10/2018 | Obara | H04B 7/08 | |
| 10,560,139 B2* | 2/2020 | Brunel | H04B 17/11 | |
| 10,567,093 B1* | 2/2020 | Buchwald | G01R 29/0878 | |
| 10,680,620 B2* | 6/2020 | Huang | H03L 7/193 | |
| 10,742,222 B2* | 8/2020 | Emira | H04L 7/007 | |
| 10,763,791 B2* | 9/2020 | Hagen | H04B 1/40 | |
| 10,862,516 B1* | 12/2020 | Chiang | H03F 3/189 | |
| 10,873,486 B1* | 12/2020 | Aboudina | H03F 3/189 | |
| 11,177,988 B2* | 11/2021 | Aboudina | H04B 1/10 | |
| 11,283,666 B1* | 3/2022 | McCormick | H04L 27/367 | |
| 11,316,482 B2* | 4/2022 | Panseri | H03F 1/3241 | |
| 2002/0048326 A1* | 4/2002 | Sahlman | H03F 1/3229 | 375/297 |
| 2002/0186783 A1* | 12/2002 | Opas | H03F 1/3247 | 375/297 |
| 2003/0184371 A1* | 10/2003 | Anderson | H03F 1/3252 | 330/149 |
| 2003/0197558 A1* | 10/2003 | Bauder | H03F 1/3247 | 330/149 |
| 2003/0199264 A1* | 10/2003 | Holenstein | H04L 25/061 | 455/295 |
| 2003/0223509 A1* | 12/2003 | Ma | H03F 1/3247 | 375/296 |
| 2004/0002361 A1* | 1/2004 | Kermalli | H04B 1/18 | 455/340 |
| 2004/0058701 A1* | 3/2004 | Jung | H04L 27/2617 | 455/522 |
| 2004/0116083 A1* | 6/2004 | Suzuki | H03F 1/3258 | 330/149 |
| 2007/0178856 A1* | 8/2007 | Mitzlaff | H03F 1/02 | 455/127.1 |
| 2007/0190952 A1* | 8/2007 | Waheed | H04B 1/0475 | 455/114.3 |
| 2007/0237260 A1* | 10/2007 | Hori | H03F 1/3247 | 375/296 |
| 2009/0143031 A1* | 6/2009 | Shah | H04B 1/28 | 455/150.1 |
| 2009/0227215 A1* | 9/2009 | McCallister | H03F 3/245 | 455/114.3 |
| 2012/0034887 A1* | 2/2012 | McCallister | H03F 1/3241 | 455/127.1 |
| 2012/0106676 A1* | 5/2012 | McCallister | H03F 3/195 | 375/297 |
| 2013/0064325 A1* | 3/2013 | Kilambi | H03F 1/3241 | 375/297 |
| 2013/0141160 A1* | 6/2013 | Ohkawara | H03F 3/189 | 330/149 |
| 2013/0225084 A1* | 8/2013 | Hall | H04W 8/005 | 455/41.2 |
| 2013/0243121 A1* | 9/2013 | Bai | H03F 1/3247 | 375/297 |
| 2014/0065989 A1* | 3/2014 | McLaurin | H03F 3/189 | 455/114.3 |
| 2014/0084996 A1* | 3/2014 | Schwent | H03F 1/0222 | 327/551 |
| 2014/0166868 A1* | 6/2014 | Tekin | H03B 5/1228 | 250/252.1 |
| 2014/0347126 A1* | 11/2014 | Laporte | H03F 1/34 | 330/149 |
| 2014/0347132 A1* | 11/2014 | Kawasaki | H03F 3/24 | 330/291 |
| 2014/0348263 A1* | 11/2014 | Rollins | H04B 1/0475 | 375/296 |
| 2015/0049841 A1* | 2/2015 | Laporte | H03F 1/3241 | 375/297 |
| 2015/0055731 A1* | 2/2015 | Harris | H03F 1/3241 | 375/296 |
| 2015/0146822 A1* | 5/2015 | Copeland | H04B 1/0483 | 375/297 |
| 2015/0222287 A1* | 8/2015 | Tekin | H03M 1/001 | 341/110 |
| 2015/0381216 A1* | 12/2015 | Shor | H04L 25/03853 | 375/297 |
| 2015/0381220 A1* | 12/2015 | Gal | H03F 1/3241 | 375/296 |
| 2016/0097718 A1* | 4/2016 | Tekin | G01N 21/3581 | 250/252.1 |
| 2017/0343750 A1* | 11/2017 | Ashrafi | H04B 10/25 | |
| 2019/0115946 A1* | 4/2019 | Pehlke | H04B 1/04 | |
| 2019/0158137 A1* | 5/2019 | Brunel | H04B 1/005 | |
| 2020/0028476 A1* | 1/2020 | Kim | H04B 1/0475 | |
| 2020/0195256 A1* | 6/2020 | Emira | H04B 1/403 | |
| 2020/0204118 A1* | 6/2020 | Hagen | H04B 1/0483 | |
| 2020/0382147 A1* | 12/2020 | Menkhoff | H03F 3/195 | |
| 2021/0234736 A1* | 7/2021 | Aboudina | H04B 1/12 | |
| 2021/0234737 A1* | 7/2021 | Aboudina | H03F 3/72 | |

* cited by examiner

LINEARIZING NARROWBAND CARRIERS WITH LOW RESOLUTION PREDISTORTERS

BACKGROUND OF THE INVENTION

Radio frequency (RF) transmission sites include one or more power amplifiers. The power amplifiers amplify broadcast carriers before the broadcast carriers are transmitted. Ideal power amplifiers duplicate the input signal at the output with higher power and few, if any, distortion products. However, power amplifiers available in the market do not provide ideal performance. Rather, power amplifiers introduce distortion products (for example, $3^{rd}$ order and $5^{th}$ order harmonics) into the output signals. Predistorters, for example, Radio frequency Power Amplifier Linearizers are used to remove the distortion products from the output. Adaptive predistorters use a feedback loop to detect the distortion products in the output and introduce cancellation products with the effective inverse function of an AM-AM and AM-PM distortion in the input to cancel the distortion products in the output.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

DETAILED DESCRIPTION OF THE INVENTION

Predistorters currently available in the market are tailored for the particular application of the RF system. For this reason, relative to narrowband land mobile radio (LMR), most predistorters have a low resolution tailored to a particular minimum and maximum bandwidth of the RF system. A low resolution predistorter is, for example, a predistorter having a specific range of bandwidth over which the predistorter is efficient in cancelling intermodulation distortion (IMD) products. The specific range of bandwidth may be limited to a lower end and a higher end of bandwidth of a particular group of signals (e.g., LTE signals).

In one example, the 900 MHz land mobile radio (LMR) band was originally assigned for carrying only narrowband LMR carriers. The Federal Communications Commission (FCC) has reassigned the 900 MHz LMR band for simultaneous use with 3 MHz bandwidth LTE signals, 1.4 MHz bandwidth LTE signals, and 200 kHz Narrowband Internet of Things (IoT) signals. The RF systems operating in the 900 MHz LMR band are configured for transmitting signals using one or all of the 3 MHz LTE signals, the 1.4 MHz LTE signals, and the 200 kHz Narrowband IoT signals.

Predistorters specifically designed for LTE bandwidth are configured to linearize signals having a bandwidth greater than 1 MHz. The minimum bandwidth at which the predistorter provides desired performance is referred to as the minimum modulation bandwidth of the predistorter. Accordingly, the minimum modulation bandwidth for the predistorter designed for LTE signals is 1 MHz. In this situation, currently available predistorters for the LTE signals can handle one of the 3 MHz LTE signals and the 1.4 MHz LTE signals when transmitted individually, or any of the 3 MHz LTE signals, the 1.4 MHz LTE signals, and the 200 kHz Narrowband IoT signals when transmitted together. However, when the 200 kHz Narrowband IoT signals are transmitted individually, the output signal performance may deteriorate because the bandwidth of the transmitted signals is below the minimum modulation bandwidth of the predistorter.

One solution for the above-noted problem is to use higher resolution predistorters that can handle higher bandwidth range including the 200 kHz narrowband and the 3 MHz LTE signals. However, such predistorters are very expensive and are typically not configured to operate with other components of the 900 MHz band LMR RF systems and LTE systems. Additionally, development of new high resolution predistorters configured for operation in the 900 MHz band LMR RF systems and configured to handle the LTE signals may take time for development, market testing, and launch. This results in a delay in implementing much needed infrastructure systems for organizations using the 900 MHz band LMR RF systems.

Accordingly, there is a need for a method and apparatus for linearizing Narrowband IoT carriers with low-resolution predistorters.

One embodiment provides a radio frequency system for linearizing narrowband IoT carriers with low resolution predistorters. The system includes a power amplifier configured to amplify one or more broadcast carriers and a predistorter coupled to the power amplifier and configured to linearize the one or more broadcast carriers. The system also includes a pacification carrier generator configured to generate a pacification carrier and an electronic processor coupled to the pacification carrier. The electronic processor is configured to determine a composite bandwidth of the one or more broadcast carriers and determine whether the composite bandwidth is below a modulation bandwidth of the predistorter. The electronic processor is also configured to control the pacification carrier generator to combine the pacification carrier with the one or more broadcast carriers when the composite bandwidth is below the minimum modulation bandwidth of the predistorter.

Another embodiment provides a method for linearizing narrowband IoT carriers with low resolution predistorters. The method includes amplifying, using a power amplifier, one or more broadcast carriers and linearizing, using a predistorter coupled to the power amplifier, the one or more broadcast carriers. The method also includes determining, using an electronic processor, a composite bandwidth of the one or more broadcast carriers and determining, using the electronic processor, whether the composite bandwidth is below a modulation bandwidth of the predistorter. The method further includes controlling, using the electronic processor, a pacification carrier generator coupled to the electronic processor to combine a pacification carrier with the one or more broadcast carriers when the composite bandwidth is below the minimum modulation bandwidth of the predistorter.

Figure 1:
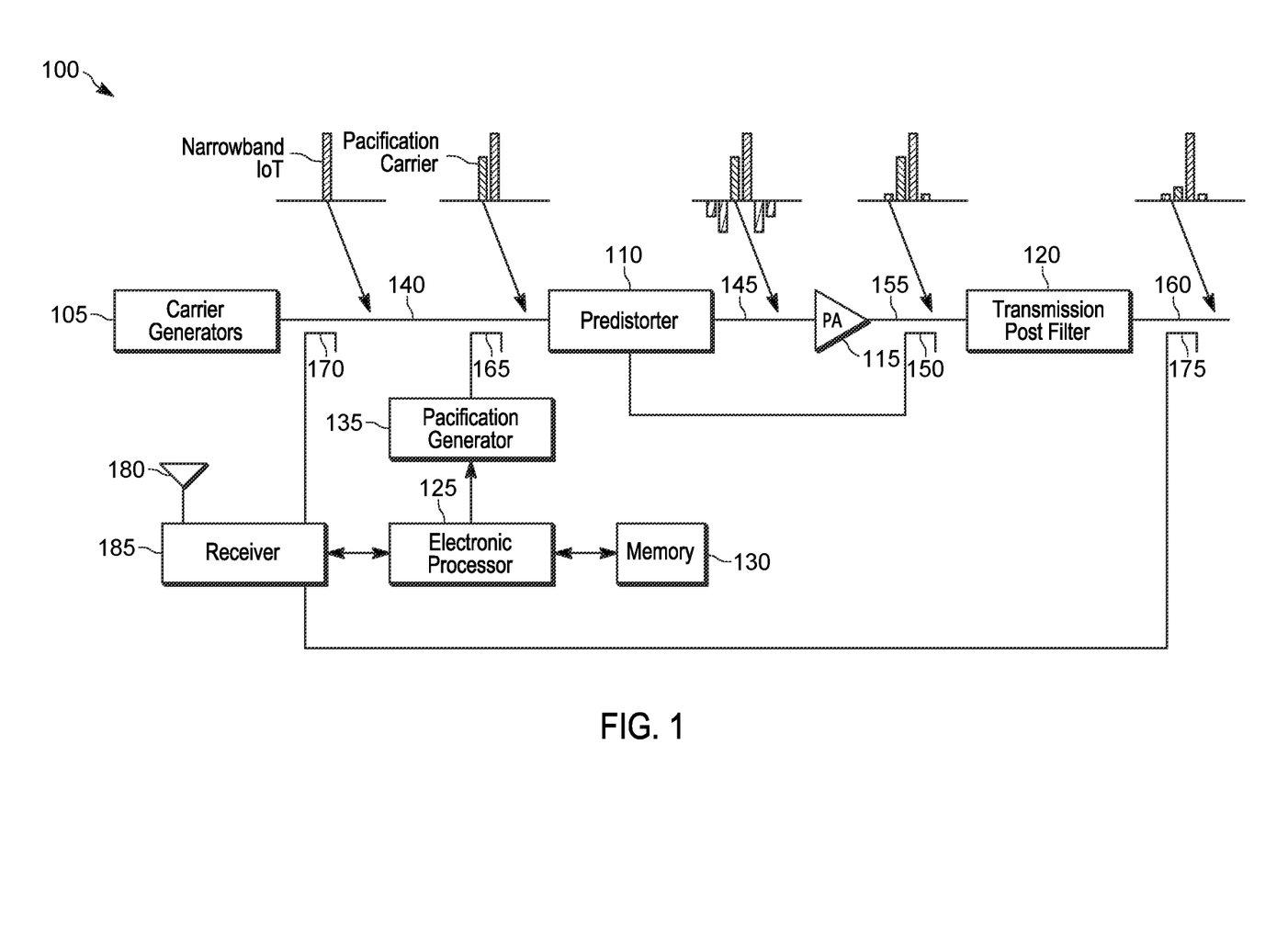
FIG. 1 is a block diagram of a radio frequency (RF) system in accordance with some embodiments.

FIG. 1 is a simplified block diagram of an example RF system 100 implementing the method for linearizing Narrowband IoT carriers with low-resolution predistorters. In the example illustrated, the RF system 100 includes carrier generators 105, a predistorter 110, a power amplifier 115, a transmission post filter 120, an electronic processor 125, a memory 130, and a pacification carrier generator 135. FIG. 1 illustrates only one example embodiment of the RF system 100. The RF system 100 may include more or fewer components and may perform additional functions other than those described herein.

The carrier generators 105 generate one or more broadcast carriers 140. The one or more broadcast carriers 140 include, for example, a 3 MHz LTE carrier, a 1.4 MHz LTE carrier, and/or a 200 kHz Narrowband IoT. The example illustrated in FIG. 1 shows the carrier generators 105 generating the 200 kHz Narrowband IoT carrier for explaining the concepts in the present disclosure. Although not illustrated, modulators are provided in the carrier generators 105 or the RF system 100. The modulators modulate symbols, information, or messages on to the one or more broadcast carriers 140 before being transmitted.

The predistorter 110 receives the one or more broadcast carriers 140 from the carrier generators 105 and provides predistorted signals 145 to the power amplifier 115. The predistorted signals 145 include cancellation products (that is, the effective inverse functions of the AM-AM and AM-PM distortion) introduced by the predistorter 110 to cancel any intermodulation distortion due to non-linearity of the power amplifier 115. When amplifying the one or more broadcast carriers 140, the cancellation products ideally cancels out any intermodulation distortion having a positive amplitude introduced by the power amplifier 115. The predistorter 110 receives the output signal of the power amplifier 115 through a predistorter coupler 150 forming a feedback loop. The predistorter 110 optimizes the cancellation products based on the feedback received over the feedback loop. The predistorter 110 has an associated minimum modulation bandwidth. The predistorter 110 provides desired predistortion performance when the composite bandwidth of the one or more broadcast carriers 140 exceeds the minimum modulation bandwidth. In some embodiments, the predistorter 110 is deactivated until a signal having a composite bandwidth greater than the minimum modulation bandwidth is provided to the predistorter 110.

The power amplifier 115 amplifies the predistorted signals 145 at an input of the power amplifier 115 to amplified signals 155 at the output of the power amplifier 115. The power amplifier 115 reproduces input signals with a higher amplitude at the output. However, the power amplifier 115 may also introduce intermodulation distortion (IMD) in the amplified signals 155. As discussed above, the IMD is cancelled or reduced by the predistorter 110.

The transmission post filter 120 is, for example, a low-pass filter, a high-pass filter, or a band-pass filter. The transmission post filter 120 removes any noise (including, for example, a pacification carrier as further described below) from the amplified signals 155 outside of the functional bandwidth of the RF system 100. The transmission post filter 120 filters the amplified signals 155 received from the power amplifier 115 to output the transmission signals 160.

The electronic processor 125 may be coupled to the carrier generators 105, the predistorter 110, the power amplifier 115, and the pacification carrier generator 135 over one or more control and/or data buses. In some embodiments, the electronic processor 125 is implemented as a microprocessor with separate memory, for example, memory 130. In other embodiments, the electronic processor 125 is implemented as a microcontroller or digital signal processor (with memory 130 on the same chip). In other embodiments, the electronic processor 125 is implemented using multiple electronic processors. In addition, the electronic processor 125 may be implemented partially or entirely as, for example, a field programmable gate array (FPGA), an application specific integrated circuit (ASIC), and the like and the memory 130 may not be needed or be modified accordingly. In the example, the electronic processor 125 is illustrated as a separate component. However, the electronic processor 125 may be included in the same integrated circuit as the predistorter 110, the same integrated circuit as the power amplifier 115, and/or the like.

In the example illustrated, the memory 130 includes non-transitory, computer readable memory that stores instructions that are received and executed by the electronic processor 125 to carry out the functionality of the RF system 100. The memory 130 may include, for example, a program storage area and a data storage area. The program storage area and the data storage area may include combinations of different types of memory, for example, read-only memory and random-access memory.

The pacification carrier generator 135 is coupled to electronic processor 125 and generates a pacification carrier based on control signals received from electronic processor 125. The pacification carrier generator 135 combines the pacification carrier with the one or more broadcast carriers 140 using the pacification coupler 165. The pacification carrier is used to increase the composite bandwidth of the one or more broadcast carriers 140 to above the minimum modulation bandwidth of the predistorter 110.

Specifically, the pacification carrier is generated in a frequency range and bandwidth to create distortion products that fall within the resolution range of the predistorter 110. No information is, however, modulated onto the pacification carrier. In some embodiments, the pacification carrier is generated in a radio frequency range that lies outside the pass band of the transmission post filter 120. Accordingly, the transmission post filter 120 attenuates the pacification carrier from the amplified signal 155. The pacification carrier is also generated at a lower power level than the one or more broadcast carriers 140. For example, the pacification carrier is generated at a power level 10 Decibels or more below a composite power of the one or more broadcast carriers 140. The use of the pacification carrier as described herein is advantageous and can be differentiated over, for example, pilot tone injection techniques. Pilot tone injection techniques rely on a pilot tone being injected into the signals to measure how well the various components are performing via the level of the pilot tone observed in an output. However, a pilot tone is not generated in response to determining a composite bandwidth. In contrast, the pacification carrier as described herein is generated to activate the predistorter 110 and create distortion products that fall within the resolution range of the low resolution predistorter 110, beneficially enabling the pacification carrier to increase the composite bandwidth of the one or more broadcast carriers.

In some embodiments, the RF system 100 optionally includes a carrier coupler 170 and/or a transmission coupler 175. The carrier coupler 170 provides information regarding the one or more broadcast carriers 140 generated by the carrier generators 105 to the electronic processor 125. The transmission coupler 175 provides information regarding the transmission signals 160 to the electronic processor 125. That is, the carrier coupler 170 and/or the transmission coupler 175 are coupled to the electronic processor 125 through a receiver 185 and detect the one or more broadcast carriers 140 transmitted by the RF system 100. The receiver 185 detects and measures one or more characteristics of the one or more broadcast carriers 140 based on the signals received from the carrier coupler 170 and/or the transmission coupler 175.

In some embodiments, an integration time, that is, a time taken to determine the composite bandwidth depends on the one or more characteristics. The receiver 185 samples a predetermined bandwidth of the coupled spectrum and determines the integration time to determine the composite bandwidth. In one example, the integration time is 15 milliseconds representing 32 swept samples of the spectrum from the receiver 185. The 32 swept samples may be considered sufficient to determine an overall operating bandwidth. In some embodiments, individual spectrum raster size may alter the number of processed samples and the integration time. In some embodiments, a-priori knowledge of possible multiple carrier configuration may also increase the integration time. For example, the integration time may be increased to 40 milliseconds or longer due to an expanded processing time of the spectrum. Therefore, the sampling period, the processing time and delay to result (that is, determination of composite bandwidth), number of integrated samples considered per decision, external input of potential matrix table of expected signals to be considers, and the like may be considered in the selection of the one or more characteristics by which the composite bandwidth is determined.

The electronic processor 125 communicates with the receiver 185 to determine a composite bandwidth of the one or more broadcast carriers 140 based on the characteristic of the one or more broadcast carriers 140. Specifically, the electronic processor 125 compares the measured characteristic to a predetermined characteristic threshold. The electronic processor 125 determines that the composite bandwidth of the one or more broadcast carriers 140 is below the minimum modulation bandwidth of the predistorter 110 when the characteristic does not satisfy the predetermined characteristic threshold. In some embodiments, the electronic processor 125 also determines that the one or more broadcast carriers 140 meet a minimum qualifying amplitude threshold. The electronic processor 125 determines that the composite bandwidth of the one or more broadcast carriers 140 is above the minimum modulation bandwidth of the predistorter 110 when the characteristic satisfies the one or more predetermined characteristic thresholds. The electronic processor 125 controls the pacification carrier based on the qualifying composite bandwidth of the one or more broadcast carriers 140 as further discussed below. Specifically, example methods are provided below that illustrate how the one or more characteristics of the one or more broadcast carriers 140 is used to determined the composite bandwidth of the one or more broadcast carriers 140.

In some embodiments, the RF system 100 optionally includes a detection antenna 180. The electronic processor 125 is coupled to the detection antenna 180 through the receiver 185 to detect the one or more broadcast carriers 140 transmitted from the RF system 100. The electronic processor 125 determines the composite bandwidth of the one or more broadcast carriers 140 based on the signals detected at the receiver 185 through the detection antenna 180. In one example, the detection antenna 180 is a pre-existing antenna of the RF system 100 that is repurposed to detect signals transmitted by the RF system 100. Additional description for the RF system 100 is provided below with respect to FIGS. 2-8C. The description below may refer back to the components of the RF system with corresponding designator numerals as shown in FIG. 1.

Figure 2:
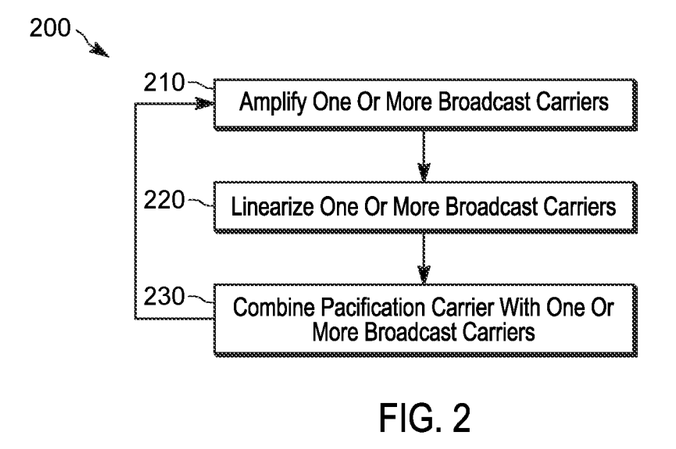
FIG. 2 is a flowchart of a method for linearizing carriers with low resolution predistorters in the RF system of FIG. 1 in accordance with some embodiments.

FIG. 2 is a flowchart of an example method 200 for linearizing Narrowband IoT carriers with low-resolution predistorters. In the example illustrated, the method 200 includes amplifying, using the power amplifier 115, the one or more broadcast carriers 140 (at block 210). As discussed above, the carrier generators 105 generate one or more broadcast carriers 140. The one or more broadcast carriers 140 are amplified by the power amplifier 115 for transmission.

The method 200 includes linearizing, using the predistorter 110, the one or more broadcast carriers 140 (at block 220). The predistorter 110 receives the one or more broadcast carriers 140 from the carrier generators 105 and the feedback signal from the predistorter coupler 150. The predistorter 110 introduces cancellation products into the one or more broadcast carriers 140 which cancel any IMD products due to non-linearity of the power amplifier 115.

The method 200 also includes combining, using the pacification carrier generator 135, the pacification carrier with the one or more broadcast carriers 140 (at block 230). The combination resulting in composite bandwidth greater than modulation bandwidth of the predistorter 110 thereby activating the predistorter 110. The pacification carrier is combined with the one or more broadcast carriers 140 resulting in a composite bandwidth that is above the minimum modulation bandwidth of the predistorter 110. For example, the minimum modulation bandwidth of the predistorter 110 is 1 MHz. When the one or more broadcast carriers 140 includes a 200 kHz Narrowband carrier, the composite bandwidth of the one or more broadcast carriers 140 is 200 kHz. The composite bandwidth of 200 kHz is well below the minimum modulation bandwidth of the predistorter 110. Due to the low resolution of the predistorter 110, the predistorter 110 may not be capable or efficient at removing the IMD products in the output signals for broadcast carrier with bandwidth below 1 MHz.

The generated pacification carrier may have a frequency that is sufficiently separated from the carrier signals to increase the composite bandwidth of the one or more broadcast carriers 140 to above the minimum modulation bandwidth of the predistorter 110. For example, when a narrow band IoT signal is centered at 937.9 MHz and has an upper end of the bandwidth located at 938 MHz, the pacification carrier may be generated with a frequency of 937 MHz and combined with the one or more broadcast carriers 140 resulting in a combined signal having a bandwidth greater than 1 MHz. As discussed above, the pacification carrier is generated in a frequency range that is filtered out by the transmission post filter 120 such that the pacification carrier is not transmitted by the RF system 100.

The blocks 210, 220, 230 may not be performed in the order illustrated in FIG. 2. As can be understood by one of ordinary skill in the art, the blocks 210, 220, 230 may be performed in any order or simultaneously. One advantage of method 200 is that predistorters currently available in the market or currently being implemented in live RF systems may be used to linearize Narrowband IoT carriers in the 900 MHz LMR band.

Figure 3:
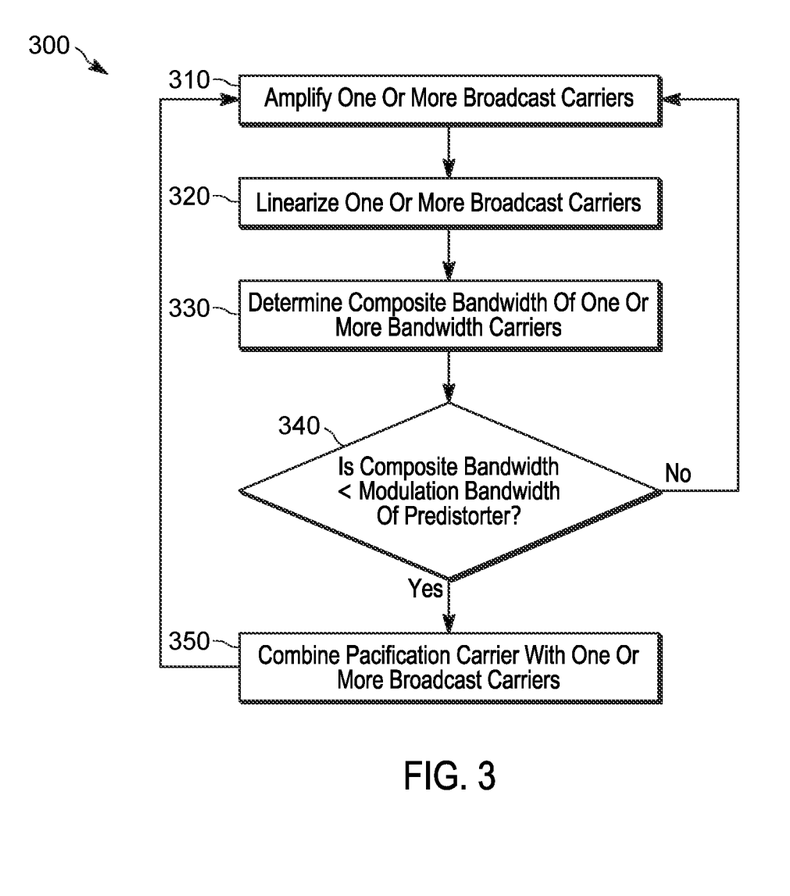
FIG. 3 is a flowchart of a method for linearizing carriers with low resolution predistorters in the RF system of FIG. 1 in accordance with some embodiments.

FIG. 3 is a flowchart of an example method 300 for linearizing Narrowband IoT carriers with low-resolution predistorters. In the example illustrated, the method 300 includes amplifying, using the power amplifier 115, the one or more broadcast carriers 140 (at block 310). As discussed above, the carrier generators 105 generate one or more broadcast carriers 140. The one or more broadcast carriers 140 are amplified by the power amplifier 115 for transmission.

The method 300 includes linearizing, using the predistorter 110, the one or more broadcast carriers 140 (at block 320). The predistorter 110 receives the one or more broadcast carriers 140 from the carrier generators 105 and the feedback signal from the predistorter coupler 150. The predistorter 110 introduces cancellation products into the one or more broadcast carriers 140 which cancel any IMD products due to non-linearity of the power amplifier 115.

The method 300 includes determining, using the electronic processor 125, a composite bandwidth of the one or more broadcast carriers 140 (at block 330). As discussed above, the receiver 185 detects the one or more characteristics of the one or more broadcast carriers 140 using, for example, the carrier coupler 170, the transmission coupler 175, and/or the detection antenna 180. In some embodiments, other methods may be used to detect the one or more characteristics of the one or more broadcast carriers 140. The characteristic is indicative of the composite bandwidth of the one or more broadcast carriers 140. The one or more characteristics are, for example, the composite bandwidth of the one or more broadcast carriers 140, a bandwidth of each individual carrier of the one or more broadcast carriers 140, a received signal strength indicator (RSSI) of the one or more broadcast carriers 140, a composite power of the one or more broadcast carriers 140, a difference between the highest detected frequency and the lowest detected frequency of the one or more broadcast carriers 140, and/or the like. The electronic processor 125 determines a composite bandwidth of the one or more broadcast carriers 140 based on the one or more characteristics. In some embodiments, the electronic processor 125 may have a-priori knowledge of the composite bandwidth of the current transmission of the RF system 100.

The method 300 includes determining, using the electronic processor 125 whether the composite bandwidth of the one or more broadcast carriers 140 is below the minimum modulation bandwidth of the predistorter 110 (at block 340). The electronic processor 125 compares the composite bandwidth to a minimum modulation bandwidth threshold to determine whether the composite bandwidth is below the minimum modulation bandwidth of the predistorter 110.

When the composite bandwidth is below the minimum modulation bandwidth, the method 300 includes combining, using the pacification carrier generator 135, the pacification carrier with the one or more broadcast carriers 140 (at block 350). The combination resulting in composite bandwidth greater than the minimum modulation bandwidth of the predistorter 110. The combination described in block 350 is similar to the combination described in block 230 of method 200.

The blocks 310-350 of method 300 may not be performed in the order illustrated in FIG. 3. Some or all of the block 310-350 may be performed in a different order or simultaneously. The method 300 provides an additional advantage of turning on the pacification carrier only when needed to increase the composite bandwidth while turning off the pacification carrier when the composite bandwidth is already above the minimum modulation bandwidth. This provides additional power savings for the RF system 100 and can allow for more optimal linearization when the pacification carrier is not added.

Figure 4:
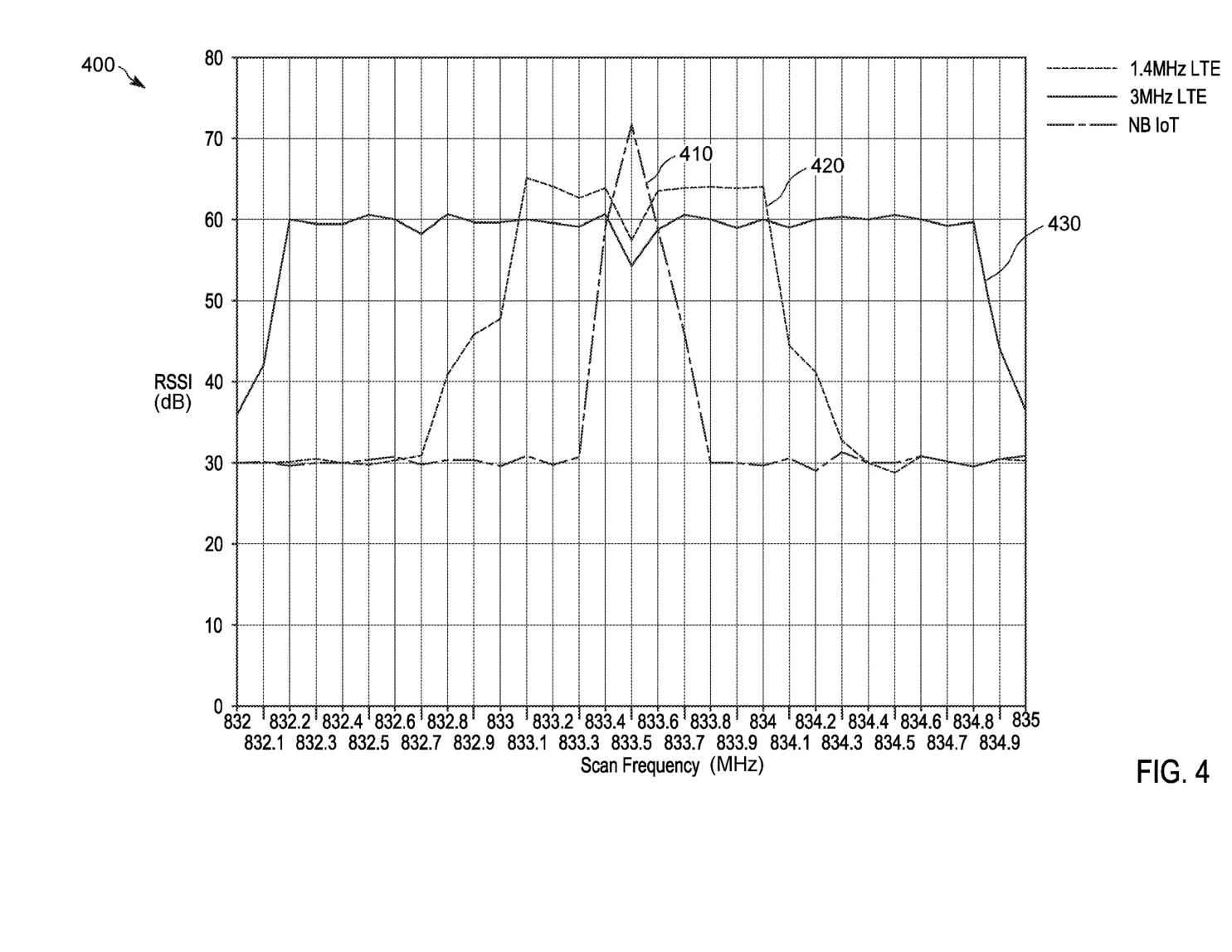
FIG. 4 is a graphical representation of received signal strength indicators of one or more broadcast carriers of the RF system of FIG. 1 in accordance with some embodiments.
Figure 5:
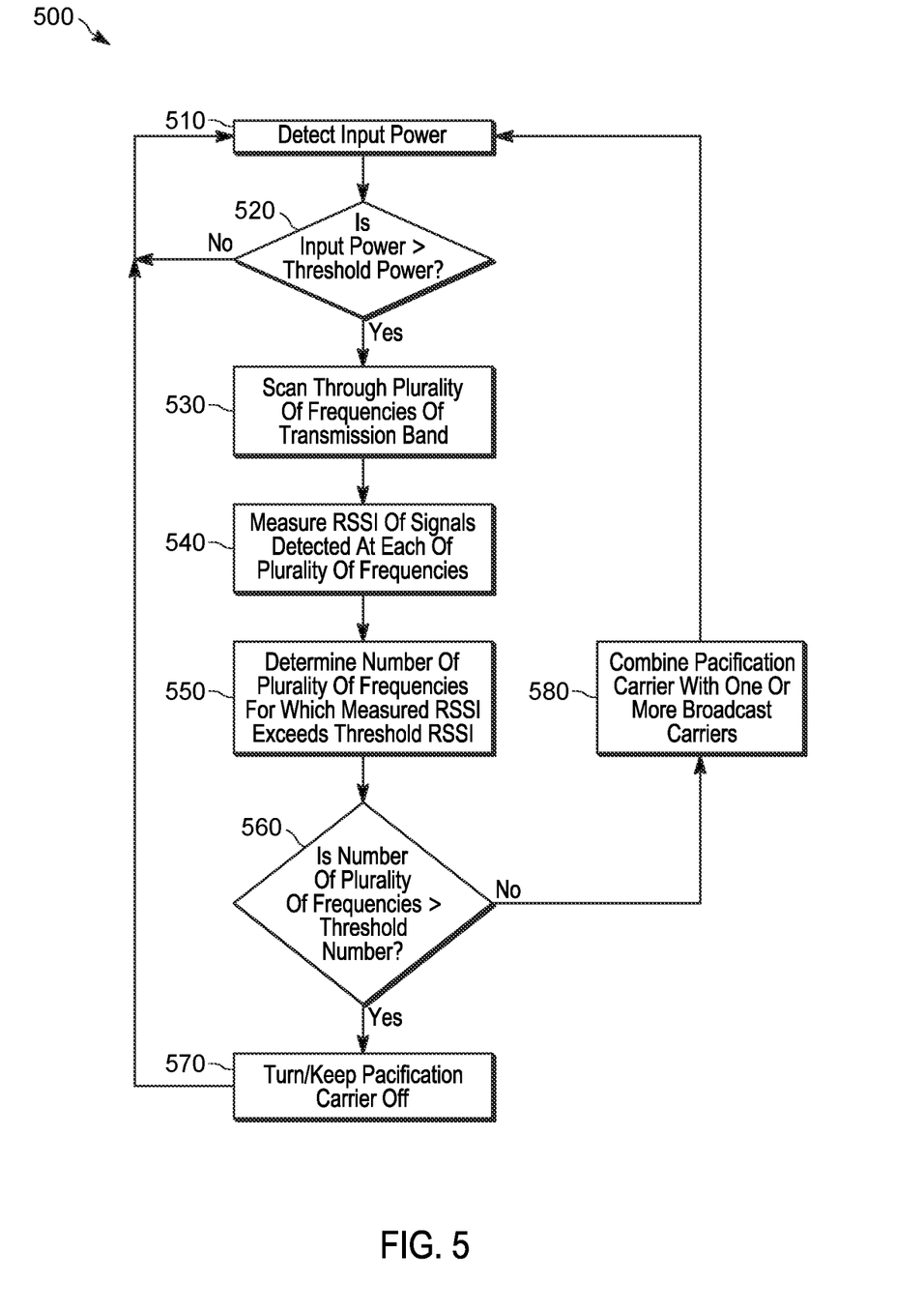
FIG. 5 is a flowchart of a method for linearizing carriers with low resolution predistorters in the RF system of FIG. 1 in accordance with some embodiments.
Figure 6:
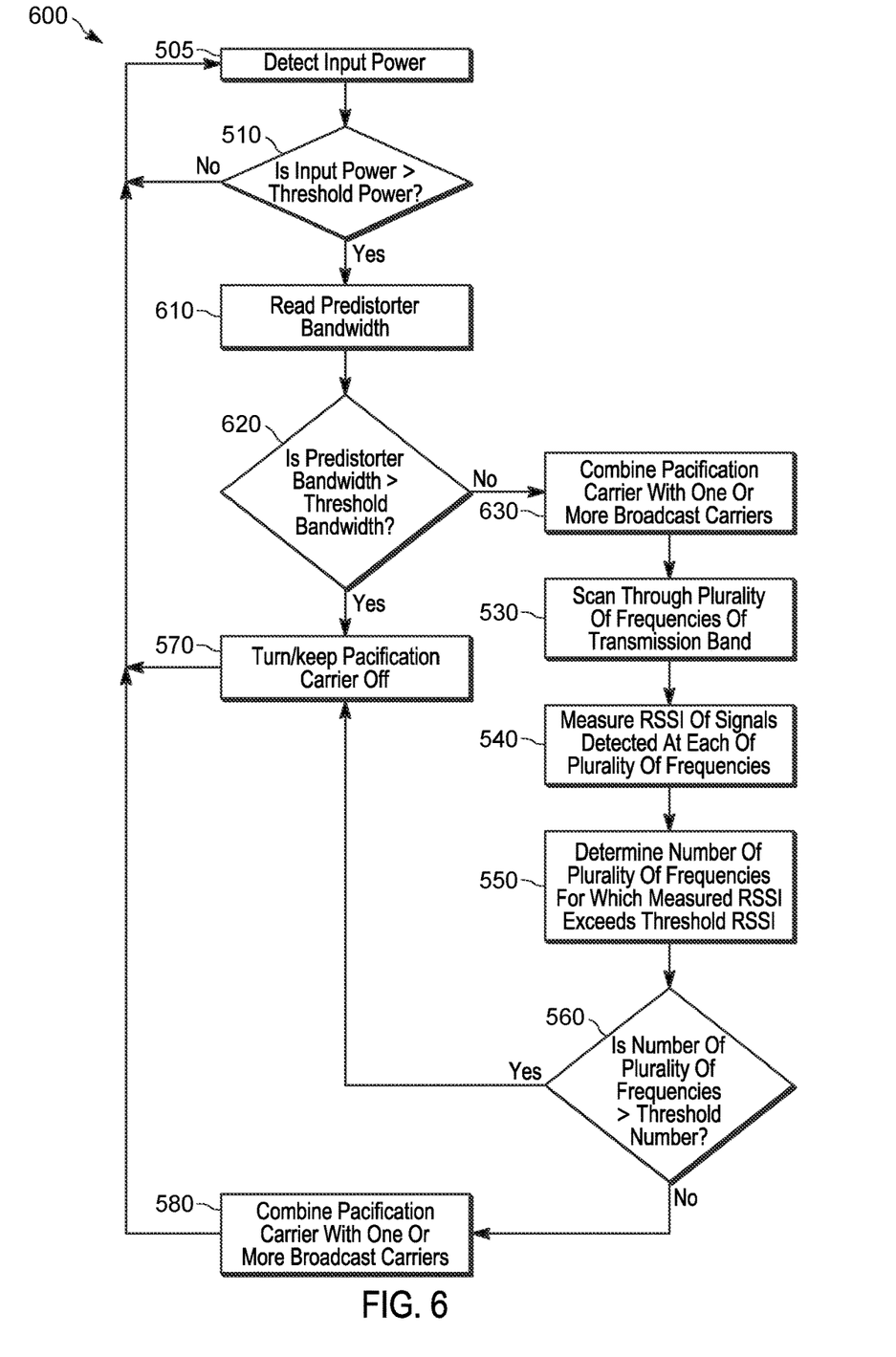
FIG. 6 is a flowchart of a method for linearizing carriers with low resolution predistorters in the RF system of FIG. 1 in accordance with some embodiments.

In some embodiments, the composite bandwidth of the one or more broadcast carriers 140 can be determined based on the RSSI of the transmitted signals. The electronic processor 125 measures the RSSI via the receiver 185 of the transmitted signals using the detection antenna 180, the carrier coupler 170, or the transmission coupler 175. FIG. 4 illustrates an example RSSI signature 400 of the signals transmitted by a 900 MHz band LMR Radio RF system 100. Specifically, FIG. 4 illustrates the RSSI signature of the 3 MHz LTE carrier 430, the RSSI signature of the 1.4 MHz LTE carrier 420, and the RSSI signature of the 200 kHz Narrowband IoT carrier 410 with a center frequency of 833.6 MHz. The 200 kHz Narrowband IoT carrier exhibits an RSSI spike above 40 decibels (dB) over a range of four frequencies (that is, between 833.4-833.7 MHz). The 3 MHz LTE carrier and the 1.4 MHz LTE carrier exhibit RSSI spikes above 40 dB over a larger range of frequencies, for example, over six frequencies. Based on these characteristics of the broadcast carriers, one can determine whether the composite bandwidth of the one or more broadcast carriers 140 is greater than the minimum modulation bandwidth if the detected RSSI is above 40 dB for six consecutive frequencies. This is because the inclusion of the 1.4 MHz and/or the 3 MHz LTE carrier in the one or more broadcast carriers 140 means that the composite bandwidth of the one or more broadcast carriers 140 is above the minimum modulation bandwidth of, for example, 1 MHz. FIGS. 5 and 6 illustrate example methods of using the RSSI signature of the one or more broadcast carriers 140 to determine whether the composite bandwidth is below the minimum modulation bandwidth of the predistorter 110.

FIG. 5 is a flowchart of one example method 500 for linearizing Narrowband IoT carriers with low resolution predistorters. In the example illustrated, the method 500 includes detecting, using the electronic processor 125, input power (at block 510). The input power is, for example, the power input to the predistorter 110 or the power amplifier 115. In some embodiments, the electronic processor 125 detects the input power using the carrier coupler 170, the detection antenna 180, or the transmission coupler 175 via the receiver 185. In other embodiments, the electronic processor 125 has a-priori knowledge of the input power based on the transmission schedule of the RF system 100.

The method 500 includes determining, using the electronic processor 125, whether the input power is greater than a threshold power (at block 520). The input power indicates whether the RF system 100 is currently transmitting RF signals. The threshold power may be preset into the memory 130. The threshold power is preset to a value that indicates that the RF system 100 is operational and is transmitting RF signals (for example, LTE and/or Narrowband signals). When the input power is below the threshold power, the method 500 returns to block 505 to continuously check for input power.

When the input power is greater than threshold power, the method 500 includes scanning, using the electronic processor 125, through a plurality of frequencies of a transmission band of the RF system 100 (at block 530). As shown in FIG. 4, the transmission band is the 900 MHz LMR band. The scanning begins at 832 MHz and proceeds through 835 MHz in predetermined steps, for example, in steps of 100 kHz. The method 500 includes measuring, using the electronic processor 125, a received signal strength indicator (RSSI) of signals detected at each of the plurality of frequencies (at block 540). In some embodiments, the electronic processor 125 uses the detection antenna 180 to measure the RSSI based on signals detected at the detection antenna 180. In other embodiments, the electronic processor 125 uses one or both of the carrier coupler 170 and the transmission coupler 175 (for example, a detection coupler) to measure the RSSI based on signals detected at the one or both couplers 170, 175.

The method 500 further includes determining, using the electronic processor 125, a number of the plurality of frequencies for which the RSSI exceeds a threshold RSSI (at block 550). The threshold RSSI is, for example, 40 dB as illustrated in FIG. 4. The threshold RSSI may be prestored in the memory 130 based on the characteristics of the RF system 100. The electronic processor 125 compares the measured RSSI at the scanned frequencies to determine whether the RSSI at the selected frequencies exceeds the threshold RSSI.

The method 500 includes determining, using the electronic processor 125, whether the number of plurality of frequencies exceeds a threshold number (at block 560). As discussed above with respect to FIG. 4, when the number of plurality of frequencies reaches six or increases over six, the electronic processor 125 determines that the composite bandwidth of the one or more broadcast carriers 140 is greater than the minimum modulation bandwidth of the predistorter 110.

When the number of plurality of frequencies exceeds the threshold number, the method 500 includes turning or keeping, using the electronic processor 125, the pacification carrier off (at block 570). The electronic processor 125 determines that the composite bandwidth of the one or more broadcast carriers 140 exceeds the minimum modulation bandwidth of the predistorter 110 when the number of plurality of frequencies exceeds the threshold number. The electronic processor 125 controls the pacification carrier generator 135 to turn off or keep the pacification carrier off for the current transmission of the RF system 100. Specifically, the electronic processor 125 controls the pacification carrier generator 135 to stop generation of the pacification carrier when the composite bandwidth is above the minimum modulation bandwidth of the predistorter 110.

When the number of plurality of frequencies does not exceed the threshold number, the method 700 includes combining, using the pacification carrier generator 135, the pacification carrier with the one or more broadcast carriers 140 (at block 580). The electronic processor 125 determines that the composite bandwidth of the one or more broadcast carriers 140 is below the minimum modulation bandwidth of the predistorter 110 when the number of plurality of frequencies does not exceed the threshold number. The electronic processor 125 controls the pacification carrier generator 135 to generate the pacification carrier and combine the pacification carrier with the one or more broadcast carriers 140 using the pacification coupler 165. The method 500 repeats for each transmission of the RF system 100.

FIG. 6 is a flowchart of one example method 600 for linearizing Narrowband IoT carriers with low resolution predistorters. The method 600 is similar to the method 500 with like numeral referring to like blocks. For conciseness, explanation of blocks that were already described with respect to FIG. 5 are omitted below. In the example illustrated, the method 600 includes detecting the input power (at block 510) and determining whether the input power is greater than the threshold power (at block 520). When the input power is greater than threshold power, the method 600 includes reading, using the electronic processor 125, a predistorter bandwidth (at block 610). The electronic processor 125 communicates with the predistorter 110 using a communication bus to receive inputs from the predistorter 110. The predistorter 110 provides a current bandwidth to the electronic processor 125.

The method 600 includes determining, using the electronic processor 125, whether the predistorter bandwidth is greater than threshold bandwidth (at block 620). The threshold bandwidth may be set to the minimum modulation bandwidth, just higher than modulation bandwidth, or just lower than modulation bandwidth of the predistorter 110. The threshold bandwidth is stored in the memory 130. The electronic processor 125 compares the predistorter bandwidth to the threshold bandwidth. When the predistorter bandwidth is greater than the threshold bandwidth, the method 600 proceeds to block 570.

When the predistorter bandwidth is less than the threshold bandwidth, the method 600 includes combining, using the pacification carrier generator 135, the pacification carrier with the one or more broadcast carriers 140 (at block 630). The electronic processor 125 controls the pacification carrier generator 135 to generate the pacification carrier and combine the pacification carrier with the one or more broadcast carriers 140 using the pacification coupler 165. After combining the pacification carrier with the one or more broadcast carrier, the method 600 proceeds to block 530 to scan through the plurality of frequencies of the transmission band. The method 600 repeats for each transmission of the RF system 100.

It should be noted that the blocks in methods 500 and 600 may not be performed in the order illustrated unless otherwise specified. Rather, the blocks may be performed in any order or simultaneously. In addition, all blocks need not be performed. For example, blocks 510 and 520 may be omitted in some instances.

Figure 7:
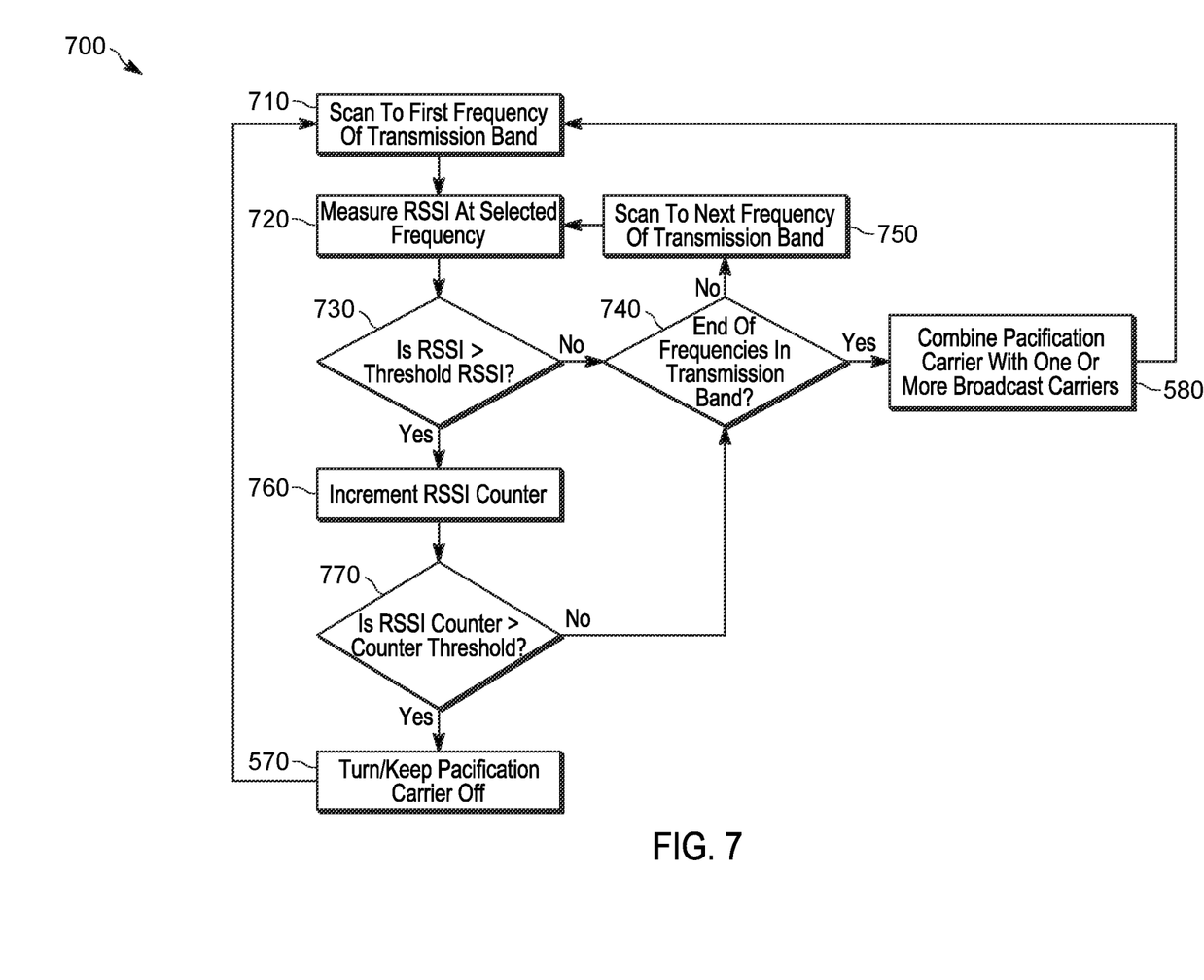
FIG. 7 is a flowchart of a method for determining a composite bandwidth of one or more broadcast carriers of the RF system of FIG. 1 in accordance with some embodiments.

FIG. 7 is a flowchart of an example method 700 for scanning through a plurality of frequencies to determine a composite bandwidth of the one or more broadcast carriers 140. Specifically, the method 700 provides an example of how the process described in blocks 530 to 560 is carried out. The method 700 includes scanning, using the electronic processor 125, to a first frequency of the transmission band (at block 710). In the example illustrated, the transmission band is the 900 MHz LMR band. As shown in FIG. 4, the scanning begins at 832 MHz and the detection antenna 180 is set to detect signals at that frequency. The method 700 includes measuring, using the electronic processor 125, RSSI at the selected frequency (at block 720). The electronic processor 125 uses the detection antenna 180 to detect a signal transmitted at the selected frequency. The electronic processor 125 measures the signal strength (that is, the RSSI) of the detected signal. As discussed above, the electronic processor 125 may use the couplers 170, 175 to detect and measure RSSI at the selected frequencies.

The method 700 includes determining, using the electronic processor 125, whether the RSSI at the scanned frequency is greater than the threshold RSSI (at block 730). The threshold RSSI is, for example, 40 dB as illustrated in FIG. 4. The threshold RSSI may be prestored in the memory 130 based on the characteristics of the RF system 100. The electronic processor 125 compares the measured RSSI at the scanned frequency to determine whether the RSSI at the selected frequency exceeds the threshold RSSI.

When the measured RSSI at the selected frequency is below the threshold RSSI, the method 700 includes determining, using the electronic processor 125, whether an end of frequencies in the transmission band is reached (at block 740). The electronic processor 125 detects whether all the frequencies in the transmission band, for example, from 832 MHz to 835 MHz have been scanned. When the end of frequencies in the transmission band is not reached, the method 700 includes scanning, using the electronic processor 125, to the next frequency in the transmission band (at block 750). The method 700 continues to scan the frequencies until the end of the frequencies in the transmission band is reached. The method then proceeds to block 720 to measure the RSSI at the selected frequency.

When the measured RSSI at the selected frequency is above the threshold RSSI, the method 700 includes incrementing, using the electronic processor 125, an RSSI counter (at block 760). The RSSI counter is maintained in the electronic processor 125 to track the number of times the RSSI exceeds the threshold RSSI in the transmission band.

After the RSSI counter is incremented, the method 700 includes determining, using the electronic processor 125, whether the RSSI counter is greater than the counter threshold (at block 770). As discussed above with respect to FIG. 4, when the RSSI counter reaches six or increases over six, the electronic processor 125 determines that the composite bandwidth of the one or more broadcast carriers 140 is greater than the minimum modulation bandwidth of the predistorter 110. When the RSSI counter is greater than the counter threshold, the method 700 includes turning or keeping, using the electronic processor 125, the pacification carrier off (at block 570). The electronic processor 125 controls the pacification carrier generator 135 to turn off or keep the pacification carrier off for the current transmission of the RF system 100. The electronic processor 125 resets the RSSI counter for the next transmission of the RF system 100.

When the RSSI counter is not greater than the counter threshold, the method 700 returns to block 740 to determine whether an end of frequencies in the transmission range is reached. When the end of frequencies in the transmission range is reached at block 740 and the RSSI counter does not exceed the counter threshold, the method 700 includes combining, using the pacification carrier generator 135, the pacification carrier with the one or more broadcast carriers 140 (at block 580). The electronic processor 125 controls the pacification carrier generator 135 to generate the pacification carrier and combine the pacification carrier with the one or more broadcast carriers 140 using the pacification coupler 165. The electronic processor 125 resets the RSSI counter for the next transmission of the RF system 100. The method 700 repeats for each transmission of the RF system 100.

Figure 8A:
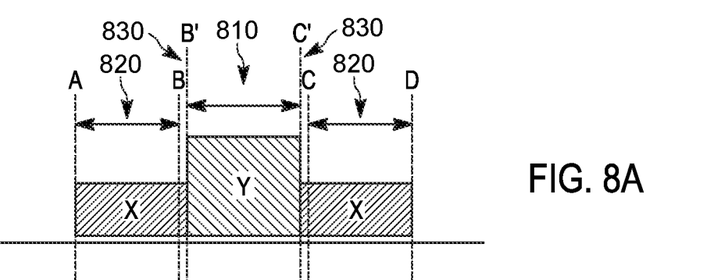
FIGS. 8A-8C are graphical representations illustrating example carrier and distortion energy products of carrier signals of the RF system of FIG. 1 in accordance with some embodiments.
Figure 8B:
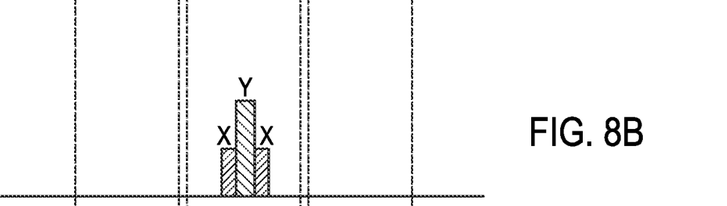
Figure 8C:
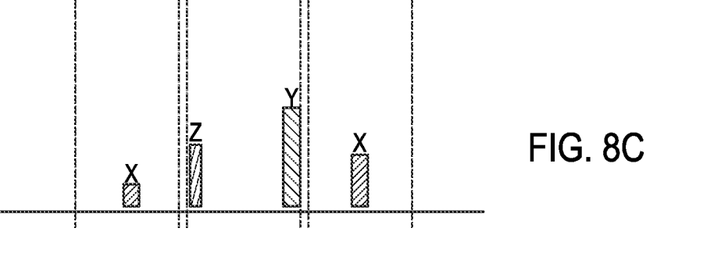

FIGS. 8A-8C illustrate examples of carrier and distortion energy products of the one or more broadcast carriers 140. The term "low resolution" when used with respect to a predistorter 110 is used from the perspective of a narrowband broadcast carrier application (for example, NB-IoT application). This contrasts with the minimum modulation bandwidth for which the given predistorter 110 was designed for (for example, LTE signals having a bandwidth between 1.4 MHz and 20 MHz). For the LTE spectrum, the predistorter 110 would not be considered low resolution.

FIG. 8A illustrates example energy products when the one or more broadcast carriers 140 includes a 1.4 MHz LTE signal (that is, broadcast carrier Y). Region 810 between C' and B' is the minimum modulation bandwidth of a given predistorter 110 for a broadcast carrier Y. The broadcast carrier Y is determined in the region 810. Region 820 between B and A and between C and D represents the bandwidth of where the distortion energy X will reside from the broadcast carrier Y. Region 830 between B' and B and between C and C' represents a guard band. Energy of the spectrum in the region 830 may be ignored by the predistorter 110. Specifically, the predistorter 110 may not discern whether the energy is from the broadcast carrier Y or the distortion energy X.

FIG. 8B illustrates example energy products when the one or more broadcast carriers 140 includes only a narrow bandwidth 200 kHz carrier (that is, broadcast carrier Y). The composite bandwidth of the broadcast carrier Y does not meet the minimum modulation bandwidth of the predistorter 110. The distortion products X and the broadcast carrier Y lie inside the minimum modulation bandwidth of the predistorter 110. The predistorter 110 in this example may not discern the distortion energy X from the broadcast carrier energy Y. No distortion energy X is present in the region 820. Therefore, the predistorter 110 may not determine whether the ratio of broadcast carrier energy Y to distortion energy X is improving with the linearization applied. That is, the predistorter 110 does not have the resolution to resolve the individual distortion energy X and the narrow bandwidth broadcast carrier energy Y.

FIG. 8C illustrates example energy products when the one or more broadcast carriers 140 including only the narrow bandwidth 200 kHz carrier (that is, the broadcast carrier Y) is combined with a pacification carrier Z. The pacification carrier Z is generated in a frequency spectrum sufficiently separated from the narrowband carrier Y such that the bandwidth of the resultant composite signal satisfies the minimum modulation bandwidth of the predistorter 110. The resultant distortion products X of the composite signals fall in the region 820. The distortion energy X can now be discerned from the broadcast carrier Y. Distortion energy is also present in the region 820. Therefore, the predistorter can now determine whether the ratio of the broadcast carrier energy Y to the distortion energy X is improving with linearization applied. That is, a linearization solution can be found, optimized, and applied to the composite signals. The low-resolution predistorter 110 can therefore be used in applications where higher resolution is desired.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A radio frequency (RF) system for linearizing narrowband carriers with low resolution predistorters, comprising:
   a pacification carrier generator configured to selectively generate a pacification carrier which is combined with one or more broadcast carriers on a bus, wherein the pacification carrier is combined with the one or more broadcast carriers to satisfy a minimum modulation bandwidth of a predistorter;
   the predistorter coupled to receive signals from the bus and configured to linearize the received signals from the bus, wherein the linearized signals include the one or more broadcast carriers; and
   the power amplifier configured to amplify the linearized signals which include the one or more broadcast carriers.

2. The RF system of claim 1, further comprising:
   an electronic processor coupled to the pacification carrier and configured to:
      determine a composite bandwidth of the one or more broadcast carriers,
      determine whether the composite bandwidth is below a minimum modulation bandwidth of the predistorter, and
      control the pacification carrier generator to combine the pacification carrier with the one or more broadcast carriers when the composite bandwidth is below the minimum modulation bandwidth of the predistorter.

3. The RF system of claim 2, wherein the electronic processor is configured to control the pacification carrier generator to stop generation of the pacification carrier when the composite bandwidth is above the minimum modulation bandwidth of the predistorter.

4. The RF system of claim 2, wherein the minimum modulation bandwidth of the predistorter is above 1 MHz and wherein the electronic processor is further configured to combine the pacification carrier with the one or more broadcast carriers resulting in a combined signal having a bandwidth greater than 1 MHz.

5. The RF system of claim 2, wherein the electronic processor is further configured to
   scan through a plurality of frequencies of a transmission band of the RF system;

measure a received signal strength indicator (RSSI) of signals detected at each of the plurality of frequencies;

determine a number of the plurality of frequencies for which the RSSI exceeds a threshold RSSI; and determine whether the number of the plurality of frequencies exceeds a threshold number.

6. The RF system of claim 5, wherein the electronic processor is configured to:

determine that the composite bandwidth is below the minimum modulation bandwidth when the number of the plurality of frequencies does not exceed the threshold number; and determine that the composite bandwidth exceeds the minimum modulation bandwidth when the number of the plurality of frequencies exceeds the threshold number.

7. The RF system of claim 5, further comprising a detection antenna coupled to the electronic processor and configured to detect the one or more broadcast carriers transmitted by the RF system, wherein the electronic processor is configured to measure the RSSI based on signals detected at the detection antenna.

8. The RF system of claim 5, further comprising a detection coupler coupled to the electronic processor and configured to detect the one or more broadcast carriers transmitted by the RF system, wherein the electronic processor is configured to measure the RSSI based on signals detected at the detection coupler.

9. The RF system of claim 2, wherein the electronic processor is further configured to measure a characteristic of the one or more broadcast carriers;

compare the characteristic to a predetermined characteristic threshold;

determine that the composite bandwidth is below the minimum modulation bandwidth when the characteristic does not satisfy the predetermined characteristic threshold; and determine that the composite bandwidth is above the minimum modulation bandwidth when the characteristic satisfies the predetermined characteristic threshold.

10. The RF system of claim 1, further comprising:

a transmission post filter configured to filter the amplified signals received from the power amplifier, wherein the transmission post filter attenuates the pacification carrier from the amplified signals.

11. The RF system of claim 1, wherein the pacification carrier is generated at a power level 10 Decibels or more below a composite power of the one or more broadcast carriers.

12. The RF system of claim 1, wherein the one or more broadcast carriers are narrowband carriers which include 200 kHz internet of things (IoT) carriers.

13. A method for linearizing narrowband carriers with low resolution predistorters, comprising:

selectively generating, using a pacification carrier generator, a pacification carrier which is combined with one or more broadcast carriers on a bus, wherein the pacification carrier is combined with the one or more broadcast carriers to satisfy a minimum modulation bandwidth of a predistorter;

linearizing, using the predistorter coupled to receive signals from the bus, the received signals from the bus, wherein the linearized signals include the one or more broadcast carriers; and amplifying, using a power amplifier, the linearized signals which include the one or more broadcast carriers.

14. The method of claim 13, further comprising:

determining, using an electronic processor, a composite bandwidth of the one or more broadcast carriers;

determining, using the electronic processor, whether the composite bandwidth is below a minimum modulation bandwidth of the predistorter; and controlling, using the electronic processor, the pacification carrier generator coupled to the electronic processor to combine the pacification carrier with the one or more broadcast carriers when the composite bandwidth is below the minimum modulation bandwidth of the predistorter.

15. The method of claim 14, further comprising controlling, using the electronic processor, the pacification carrier generator to stop generation of the pacification carrier when the composite bandwidth is above the minimum modulation bandwidth of the predistorter.

16. The method of claim 14, wherein the minimum modulation bandwidth of the predistorter is above 1 MHz, the method further comprising:

combining, using the electronic processor, the pacification carrier with the one or more broadcast carriers resulting in a combined signal having a bandwidth greater than 1 MHz.

17. The method of claim 14, further comprising:

scanning, using the electronic processor, through a plurality of frequencies of a transmission band of the RF system;

measuring, using the electronic processor, a received signal strength indicator (RSSI) of signals detected at each of the plurality of frequencies;

determining, using the electronic processor, a number of the plurality of frequencies for which the RSSI exceeds a threshold RSSI; and determining, using the electronic processor, whether the number of the plurality of frequencies exceeds a threshold number.

18. The method of claim 17, further comprising:

determining, using the electronic processor, that the composite bandwidth is below the minimum modulation bandwidth when the number of the plurality of frequencies does not exceed the threshold number; and determining, using the electronic processor that the composite bandwidth exceeds the minimum modulation bandwidth when the number of the plurality of frequencies exceeds the threshold number.

19. The method of claim 17, further comprising:

measuring, using a detection antenna coupled to the electronic processor, the RSSI based on signals detected at the detection antenna.

20. The method of claim 17, further comprising: measuring, using a detection coupler, the RSSI based on signals detected at the detection coupler.

21. The method of claim 14, further comprising:

measuring, using the electronic processor, a characteristic of the one or more broadcast carriers;

comparing, using the electronic processor, the characteristic to a predetermined characteristic threshold;

determining, using the electronic processor, that the composite bandwidth is below the minimum modulation bandwidth when the characteristic does not satisfy the predetermined characteristic threshold; and determining, using the electronic processor, that the composite bandwidth is above the minimum modulation bandwidth when the characteristic satisfies the predetermined characteristic threshold.

22. The method of claim 13, further comprising:
attenuating, using a transmission post filter, the pacification carrier from the amplified signals.

23. The method of claim 13, wherein the pacification carrier is generated at a power level 10 Decibels or more below a composite power of the one or more broadcast carriers.

24. The method of claim 13, wherein the one or more broadcast carriers are narrowband carriers which include 200 kHz internet of things (IoT) carriers.

* * * * *